United States Patent
Ball et al.

(10) Patent No.: US 10,298,655 B2
(45) Date of Patent: May 21, 2019

(54) SYSTEMS AND METHODS FOR PROVIDING CONTENT TO VERIFIED ENTITIES

(71) Applicant: Facebook, Inc., Menlo Park, CA (US)

(72) Inventors: Allison Elaine Ball, Austin, TX (US); Kaushik Mohan Iyer, Palo Alto, CA (US); Ashoat Tevosyan, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 323 days.

(21) Appl. No.: 14/743,946

(22) Filed: Jun. 18, 2015

(65) Prior Publication Data

US 2016/0373454 A1 Dec. 22, 2016

(51) Int. Cl.
*G06F 17/30* (2006.01)
*H04L 29/08* (2006.01)
*H04L 12/58* (2006.01)

(52) U.S. Cl.
CPC ........ *H04L 67/02* (2013.01); *G06F 17/30867* (2013.01); *H04L 51/12* (2013.01); *H04L 51/32* (2013.01)

(58) Field of Classification Search
CPC .... G06F 17/30867; H04L 51/12; H04L 67/02
See application file for complete search history.

(56) References Cited

U.S. PATENT DOCUMENTS

| | | | | |
|---|---|---|---|---|
| 7,752,251 | B1* | 7/2010 | Shuster | G06F 17/30873 709/200 |
| 9,436,766 | B1* | 9/2016 | Buryak | G06F 17/30705 |
| 2012/0005224 | A1* | 1/2012 | Ahrens | H04W 4/21 707/769 |
| 2014/0359009 | A1* | 12/2014 | Shih | H04L 67/306 709/204 |
| 2015/0058320 | A1* | 2/2015 | Zheng | G06F 17/30864 707/722 |
| 2016/0259790 | A1* | 9/2016 | Mashiach | G06F 17/3053 |
| 2016/0344800 | A1* | 11/2016 | Emmanuel | H04L 67/10 |
| 2016/0371060 | A1* | 12/2016 | Goja | G06F 8/51 |

* cited by examiner

*Primary Examiner* — Joseph P Hirl
*Assistant Examiner* — Sayed Aresh Beheshti Shirazi
(74) *Attorney, Agent, or Firm* — Sheppard Mullin Richter & Hampton LLP

(57) ABSTRACT

A first set of posts associated with a verified entity can be identified. A second set of posts associated with the verified entity and with one or more particular topics can be identified. At least a first subset of the first set of posts and at least a second subset of the second set of posts can be ranked to produce a ranked set of posts that are associated, at least in part, with the verified entity. The verified entity can be provided with access to at least some posts in the ranked set of posts. Moreover, a canonical post authored by a verified entity can be identified. It can be determined that one or more subsequent posts have at least a specified threshold level of relevance with respect to the canonical post. The verified entity can be provided with access to the one or more subsequent posts.

14 Claims, 12 Drawing Sheets

SYSTEMS AND METHODS FOR PROVIDING CONTENT TO VERIFIED ENTITIES

FIELD OF THE INVENTION

The present technology relates to the field of providing content. More particularly, the present technology relates to techniques for providing content to verified entities.

BACKGROUND

Today, people often utilize computing devices (or systems) for a wide variety of purposes. Users can use their computing devices to, for example, interact with one another, access content, share content, and create content. In some cases, a user of a social networking system (or service) can utilize his or her computing device to create and post (or publish) content, such as images, videos, audio, articles, links, and text. The user can also access content via pages of other users, pages of entities, messages, or a social networking feed for the user.

In some instances, public figures, such as celebrities and politicians, can also utilize the social networking system to view, interact with, or otherwise access content. Under conventional approaches, content is generally provided to such public figures in an uninteresting or inefficient manner, similar to how content is provided to users who are not public figures. In one example, conventional approaches may present content that is not significantly relevant or interesting to a particular public figure. In another example, the particular public figure has to exert significant manual effort to browse through various content items to seek out those that are more interesting or relevant to the particular public figure. As such, conventional approaches can create challenges for or reduce the overall user experience associated with providing content to public figures via the social networking system.

SUMMARY

Various embodiments of the present disclosure can include systems, methods, and non-transitory computer readable media configured to identify a first set of posts associated with a verified entity. A second set of posts associated with the verified entity and with one or more particular topics can be identified. At least a first subset of the first set of posts and at least a second subset of the second set of posts can be ranked to produce a ranked set of posts that are associated, at least in part, with the verified entity. The verified entity can be provided with access to at least some posts in the ranked set of posts.

In an embodiment, ranking at least the first subset of the first set of posts and at least the second subset of the second set of posts can further comprise acquiring one or more features for each post in at least the first subset and at least the second subset. One or more respective weights can be applied to one or more feature values of the one or more features to produce one or more weighted feature values for each post. A respective score can be determined for each post based on the one or more weighted feature values for each post. At least the first subset and at least the second subset can be sorted based on the respective score for each post.

In an embodiment, identifying the first set of posts associated with the verified entity can further comprise identifying the first set of posts to include content about the verified entity.

In an embodiment, the content about the verified entity can include at least one of content related to a topic corresponding to the verified entity, content having searchable text that corresponds to the verified entity, content tagged with the verified entity, or content mentioned at the verified entity.

In an embodiment, identifying the second set of posts associated with the verified entity and with the one or more particular topics can further comprise identifying the second set of posts to include content about the verified entity and about the one or more particular topics.

In an embodiment, the one or more particular topics can be selected by the verified entity.

In an embodiment, identifying the second set of posts to include the content about the verified entity and about the one or more particular topics can further comprise acquiring one or more subtopics associated with the one or more particular topics. A plurality of content items in a social networking system can be analyzed to determine that at least one content item in the plurality of content items has at least a first threshold level of relevance with respect to the verified entity and at least a second threshold level of relevance with respect to at least one of: 1) the one or more particular topics or 2) the one or more subtopics. The at least one content item can be included in the second subset.

In an embodiment, at least one of the first threshold level of relevance or the second threshold level of relevance can be based on at least one of a tag included in the at least one content item, a mention included in the at least one content item, searchable text included in the at least one content item, or a media classification for media included in the at least one content item.

In an embodiment, at least the first subset of the first set of posts and at least the second subset of the second set of posts can be filtered to exclude one or more undesired posts.

In an embodiment, the one or more undesired posts can include one or more posts authored by the verified entity.

Moreover, various embodiments of the present disclosure can include systems, methods, and non-transitory computer readable media configured to identify a canonical post authored by a verified entity. It can be determined that one or more subsequent posts have at least a specified threshold level of relevance with respect to the canonical post. The verified entity can be provided with access to the one or more subsequent posts.

In an embodiment, identifying the canonical post authored by the verified entity can further comprise detecting that a content item is posted by the verified entity. It can be determined that the content item has less than a specified threshold likelihood of being previously posted by one or more users other than the verified entity. The canonical post can be identified based on the content item.

In an embodiment, it can be detected that an instance of the canonical post has been posted by a user other than the verified entity. It can be determined that the one or more subsequent posts are associated with the instance of the canonical post. The one or more subsequent posts can be determined to have at least the specified threshold level of relevance with respect to the canonical post based on the one or more subsequent posts being associated with the instance of the canonical post.

In an embodiment, determining that the one or more subsequent posts are associated with the instance of the canonical post can further comprise determining that the one or more subsequent posts include at least one comment post directed at the instance of the canonical post.

In an embodiment, determining that the one or more subsequent posts are associated with the instance of the canonical post can further comprise determining that at least one of the one or more subsequent posts corresponds to the instance of the canonical post.

In an embodiment, the instance of the canonical post can be generated based on a repost of the canonical post. The one or more subsequent posts can include the repost of the canonical post.

In an embodiment, the repost of the canonical post can be associated with at least one of a copy-and-paste operation performed by the user with respect to a uniform resource locator (URL) associated with the canonical post or a cut-and-paste operation performed by the user with respect to the uniform resource locator (URL) associated with the canonical post.

In an embodiment, the one or more subsequent posts can be authored by one or more users other than the verified entity.

In an embodiment, access to the canonical post can be provided to at least some of the one or more users other than the verified entity.

In an embodiment, a mapping between the canonical post and the verified entity can be stored in an index.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
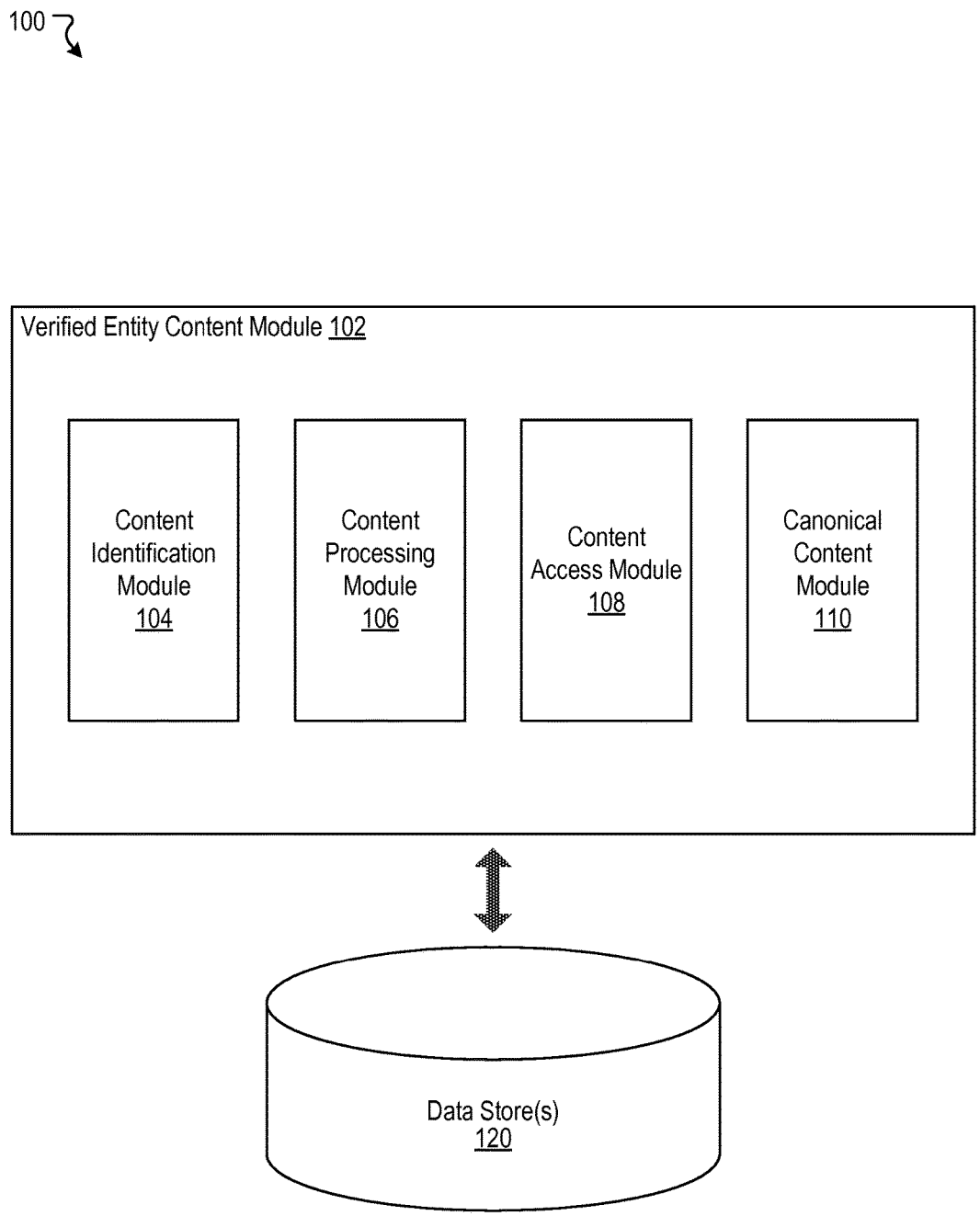
FIG. 1 illustrates an example system including an example verified entity content module configured to facilitate providing content to verified entities, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Content to Verified Entities

People use social networking systems (or services) for various purposes. Users of a social networking system can utilize their computing devices (or systems) to establish connections, communicate, and interact with one another via the social networking system. Users can also provide, create, edit, share, or access content such as images, videos, audio, articles, links, and text. In one example, a particular user of the social networking service can post or publish content items, which can be presented on a page (e.g., profile, timeline, wall, etc.) of the particular user. Other users can, for example, access, view, or interact with such content items published on the page of the particular user, as long as the particular user's privacy settings or preferences allow so. In another example, content published or posted by the particular user can be surfaced to other users via the other users' social networking feeds. Each of the other users can, for instance, have a respective feed in the social networking system, such that the particular user's published content items can be presentable via the respective feed for each of the other users, in accordance with the particular user's privacy settings or preferences.

In some cases, public figures can also use the social networking system to provide and access content. In one example, a particular public figure, such as a celebrity or a politician, may desire to view or access content that relates to himself or herself. However, under conventional approaches to providing social networking feeds, the particular public figure's social networking feed can include content that is considered to be unrelated, irrelevant, and/or uninteresting to the particular public figure. Moreover, in accordance with conventional approaches, the particular public figure often times has to search and manually browse through many content items in his or her conventional social networking feed in order to find content items that relate to him or her. These and other similar concerns can reduce the overall user experience associated with providing content to public figures via the social networking system.

Therefore, an improved approach can be beneficial for addressing or alleviating various concerns associated with conventional approaches. The disclosed technology can verify or confirm that public figures are indeed who they purport or claim to be. Confirmed public figures can then be considered verified entities. The disclosed technology can provide content to verified entities. Various embodiments of the present disclosure can identify a first set of posts associated with a verified entity. A second set of posts associated with the verified entity and with one or more particular topics can be identified. At least a first subset of the first set of posts and at least a second subset of the second set of posts can be ranked to produce a ranked set of posts that are associated, at least in part, with the verified entity. The verified entity can be provided with access to at least some posts in the ranked set of posts. Moreover, a canonical post authored by a verified entity can be identified. It can be determined that one or more subsequent posts have at least a specified threshold level of relevance with respect to the canonical post. The verified entity can be provided with access to the one or more subsequent posts. It is contemplated that there can be many variations and/or other possibilities.

FIG. 1 illustrates an example system 100 including an example verified entity content module 102 configured to facilitate providing content to verified entities, according to an embodiment of the present disclosure. As shown in the example of FIG. 1, the example verified entity content module 102 can include a content identification module 104, a content processing module 106, a content access module 108, and a canonical content module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the verified entity content module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the verified entity content module 102 can be implemented, in part or in whole, as software running on one or more computing devices or systems, such as on a user or client computing device. For example, the verified entity content module 102 or at least a portion thereof can be implemented as or within an application (e.g., app), a program, or an applet, etc., running on a user computing device or a client computing system, such as the user device 710 of FIG. 7. In another example, the verified entity content module 102 or at least a portion thereof can be implemented using one or more computing devices or systems that include one or more servers, such as network servers or cloud servers. In some instances, the verified entity content module 102 can, in part or in whole, be implemented within or configured to operate in conjunction with a social networking system (or service), such as the social networking system 730 of FIG. 7. It should be understood that there can be many variations or other possibilities.

The content identification module 104 can be configured to facilitate identifying a first set of posts (i.e., shared or published content items) associated with a verified entity. The content identification module 104 can also be configured to facilitate identifying a second set of posts associated with the verified entity and with one or more particular topics. For example, the first set of posts can correspond to a vanity experience for the verified entity, such that posts in the first set are primarily about, related to, directed at, focused on, or otherwise associated with the verified entity. The second set of posts can include posts that are primarily about, related to, directed at, focused on, or otherwise associated with the verified entity and the one or more particular topics. In some cases, the first set and the second set can be acquired from different content sources. In some instances, posts from the first and second sets can be combined (e.g., blended, aggregated, etc.) and provided to the verified entity. The content identification module 104 will be discussed in more detail below with reference to FIG. 2A.

Moreover, the content processing module 106 can be configured to facilitate handling various tasks for, or otherwise processing, content items, such as posts in the social networking system, that have been identified. In some cases, the content processing module 106 can facilitate ranking at least a first subset of the first set of posts and at least a second subset of the second set of posts to produce a ranked set of posts that are associated, at least in part, with the verified entity. More details regarding the content processing module 106 will be provided below with reference to FIG. 2B.

Further, the content access module 108 can be configured to facilitate providing the verified entity with access to at least some posts in the ranked set of posts. In some embodiments, the content access module 108 can select a specified quantity of highest ranked posts or content items to be provided to the verified entity. In some implementations, the content access module 108 can select posts or content items, which are to be provided to the verified entity, that have at least a threshold ranking metric or score. In some embodiments, the at least some posts or content items in the ranked set can be provided or presented via an interface, such as a user interface of an application. Many variations are possible.

In one example, the content access module 108 can select the at least some posts or content items for presentation to the verified entity via a feed. In this example, the content access module 108 can elect to provide or present, to the verified entity, a set number of highest ranked posts within a particular time period. For instance, the particular time period can correspond to a temporal range between now and the previous time the verified entity accessed the feed. The verified entity can also, in some cases, request for more posts, such as by inputting a command to request more posts (e.g., performing a pull-to-refresh operation). In response, additional posts can be provided, such as those from a more recent time period, an earlier time period, and/or a more expansive a time period. It should be understood that all examples herein are provided for illustrative purposes and that there can be many variations or other possibilities.

Additionally, the canonical content module 110 can be configured to facilitate identifying a canonical post authored by the verified entity. The canonical content module 110 can determine that one or more subsequent posts have at least a specified threshold level of relevance with respect to the canonical post. The canonical content module 110 can provide the verified entity with access to the one or more subsequent posts. The canonical content module 110 will be discussed in more detail below with reference to FIG. 2C.

Furthermore, in some embodiments, the verified entity content module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, user specified settings, content produced by users, and various other types of user data. In some embodiments, the at least one data store 120 can store information that is utilizable by the verified entity content module 102. Again, it should be appreciated that there can be many variations and other possibilities.

Figure 2A:
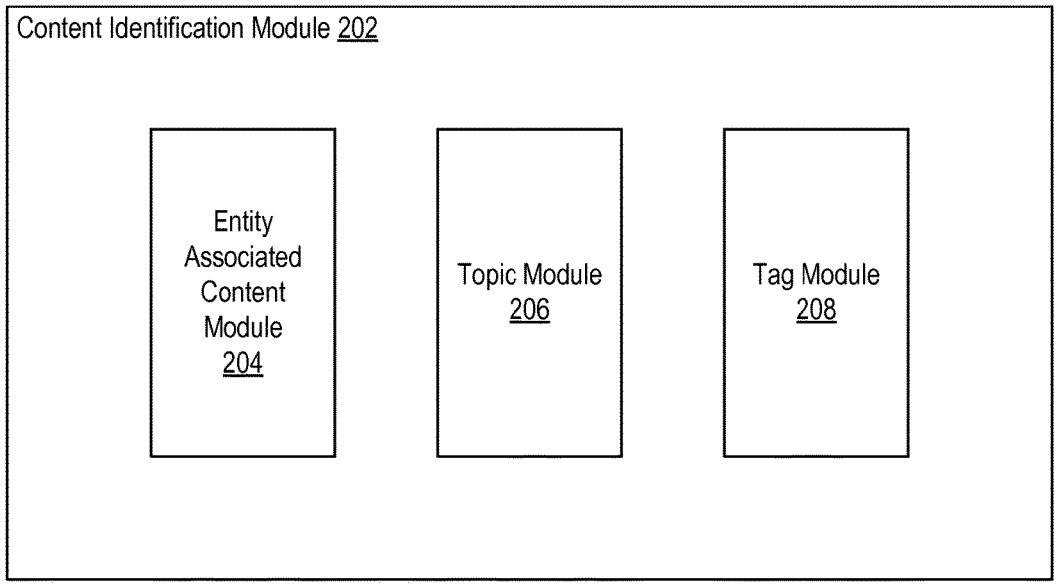
FIG. 2A illustrates an example content identification module configured to facilitate providing content to verified entities, according to an embodiment of the present disclosure.

FIG. 2A illustrates an example content identification module 202 configured to facilitate providing content to verified entities, according to an embodiment of the present disclosure. In some embodiments, the content identification module 104 of FIG. 1 can be implemented as the example content identification module 202. As shown in FIG. 2A, the example content identification module 202 can include an entity associated content module 204, a topic module 206, and a tag module 208.

As discussed above, the content identification module 202 can facilitate identifying a first set of posts (i.e., shared or published content items) associated with a verified entity. The content identification module 202 can also facilitate identifying a second set of posts associated with the verified entity and with one or more particular topics. The posts in the first set and the second set can be identified out of various posts within a social networking system. In some embodiments, the content identification module 202 can utilize the entity associated content module 204 to determine whether or not a particular post is associated with the verified entity.

In some cases, the verified entity can correspond to an entity that has been verified, based on a verification process, to be who or what the entity purports to be. The verified entity can be associated with at least one of a public figure, a brand, a company, business, or an organization, etc. The verified entity can, for instance, correspond to an official representation or an official account, at the social networking system, for a real-world public figure, brand, company, business, or organization, etc. In one example, the verified entity can correspond to a public figure, such as a celebrity, politician, reporter, or journalist, who has been verified based on the verification process. In this example, the verification process can include communicating with a representative or agent of the public figure to confirm the identity of the public figure. It should be understood that many variations are possible.

The entity associated content module 204 can determine that a plurality of posts or content items are associated with or related to the verified entity. In some instances, the entity associated content module 204 can identify the first set of posts associated with the verified entity based on identifying the first set of posts to include content about the verified entity. The content about the verified entity can include at least one of content related to a topic corresponding to the verified entity, content having searchable text that corresponds to the verified entity, content tagged with the verified entity, or content mentioned at the verified entity. For example, the entity associated content module 204 can identify content that describes, depicts, discusses, and/or converses about the verified entity.

In some cases, the entity associated content module 204 can work in conjunction with the topic module 206 and/or the tag module 208 to determine which posts describe, depict, discuss, and/or are otherwise associated with the verified entity. For instance, the topic module 206 can implement a system for identifying one or more topics (including sub-topics) described, depicted, and/or discussed by a post. If the topic module 206 determines that certain posts are describing, depicting, and/or discussing the verified entity as a topic, then the entity associated content module 204 can identify those certain posts as content about the verified entity. Similarly, if the tag module 208 determines that a particular post has tagged the verified entity, such as via a mention (e.g., an at-mention, an @-mention, an identifier/name tag, etc.) or hashtag, then the entity associated content module 204 can also identify the particular post as content about the verified entity. Moreover, the entity associated content module 204 can search text within posts to determine whether such posts have one or more words corresponding to the verified entity (e.g., a name of the verified entity, a nickname of the verified entity, etc.). If so, those posts can also be considered content about the verified entity. Many variations are possible.

Additionally, the topic module 206 can identify whether posts are associated with one or more particular topics. In some implementations, the verified entity can input or select the one or more particular topics, such as topics of subjective interest or relevance to the verified entity, which can be received by the topic module 206. In order to select (e.g., follow, subscribe to, etc.) the one or more particular topics, the verified entity can, in one example, input a keyword search, an at-mention, an @-mention, and/or a hashtag, etc. In another example, the verified entity can select the one or more particular topics from a set of suggested topics. The verified entity can also edit, curate, and/or otherwise modify the selection of one or more particular topics. In some embodiments, the topic module 206 can select the one or more particular topics to correspond to trending topics, such as currently or recently popular topics. The topic module 206 can analyze various posts, such as posts within the social networking system, to determine with which respective topic(s) each post is associated. Accordingly, in some cases, the first set of posts can be identified to include content about (e.g., primarily about, solely about, etc.) the verified entity, while the second set of posts can be identified to include content about the verified entity and about the one or more particular topics.

In some embodiments, the entity associated content module 204 can work in conjunction with the topic module 206 to facilitate identifying the second set of posts to include the content about the verified entity and about the one or more particular topics. In some cases, identifying the second set of posts to include the content about the verified entity and about the one or more particular topics can be based on acquiring, by the topic module 206, one or more subtopics associated with or included with the one or more particular topics. The entity associated content module 204 can analyze a plurality of content items in the social networking system to determine that at least one content item in the plurality of content items has at least a first threshold level of relevance with respect to the verified entity. The topic module 206 can analyze the plurality of content items in the social networking system to determine that the at least one content item in the plurality of content items also has at least a second threshold level of relevance with respect to the one or more particular topics and/or the one or more subtopics. As such, the at least one content item has at least respective threshold levels of relevance with respect to the verified entity and the one or more particular topics (including the one or more sub-topics). The at least one content item can then be included in the second set of posts. Many variations are possible.

Furthermore, the tag module 208 can be configured to analyze posts to determine with which tags (e.g., at-mentions, @-mentions/tags, identifier tags, hashtags, location tags, check-in tags, social networking tags, etc.) those posts are associated. In some embodiments, the first threshold level of relevance and/or the second threshold level of relevance, discussed above, can be based on a tag included in the at least one content item as determined by the tag module 208 and/or a mention included in the at least one content item as determined by the tag module 208. In some cases, the first threshold level of relevance and/or the second threshold level of relevance can be based on searchable text included in the at least one content item and/or a media classification (e.g., image classification, video classification, image object recognition, audio fingerprinting, etc.) for media included in the at least one content item. Again, it should be appreciated that there can be many variations or other possibilities.

Figure 2B:
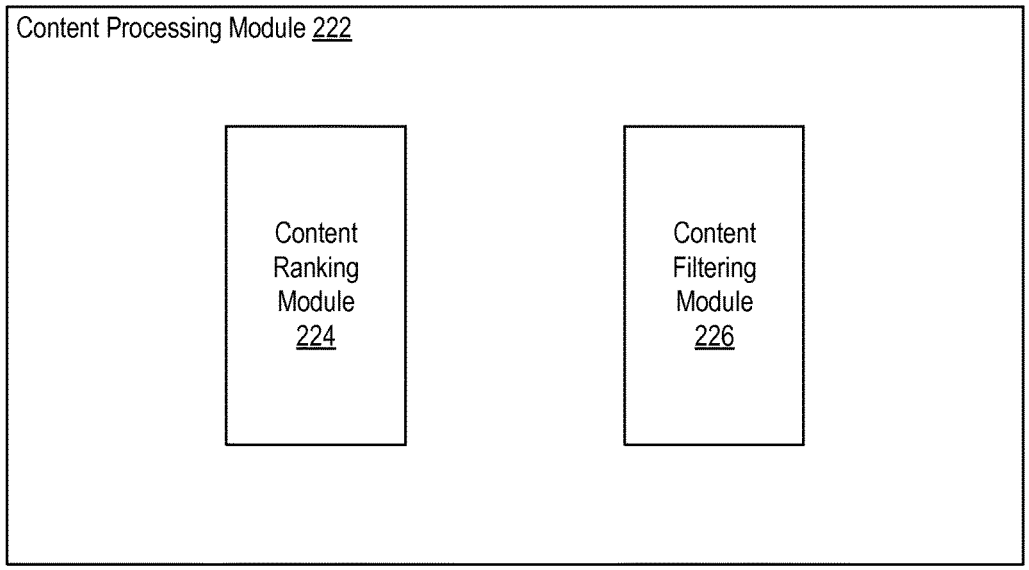
FIG. 2B illustrates an example content processing module configured to facilitate providing content to verified entities, according to an embodiment of the present disclosure.

FIG. 2B illustrates an example content processing module 222 configured to facilitate providing content to verified entities, according to an embodiment of the present disclosure. In some embodiments, the content processing module 106 of FIG. 1 can be implemented as the example content processing module 222. As shown in FIG. 2B, the example content processing module 222 can include a content ranking module 224 and a content filtering module 226.

As discussed previously, the content processing module 222 can facilitate handling various tasks for, performing operations associated with, or otherwise processing given content items, such as identified posts. In some cases, the content processing module 222 can utilize the content ranking module 224 to facilitate ranking at least a first subset of the identified first set of posts and at least a second subset of the identified second set of posts to produce a ranked set of posts that are associated (at least in part) with the verified entity. As such, the ranked set can include posts or content items acquired from different content sources. Such posts in the ranked set can, for instance, be combined (e.g., blended, aggregated, etc.) during the ranking.

In some embodiments, the content ranking module 224 can rank at least the first subset of the first set of posts and at least the second subset of the second set of posts based on acquiring one or more features for each post in at least the first subset and at least the second subset. The one or more features for each post can, for example, include at least one of characteristics, properties, statistics, metadata, or other information associated with each post. The content ranking module 224 can apply one or more respective weights to one or more feature values of the one or more features to produce one or more weighted feature values for each post. The content ranking module 224 can determine a respective score for each post based on the one or more weighted feature values for each post. Furthermore, the content ranking module 224 can sort at least the first subset and at least the second subset based on the respective score for each post. Subsequent to being sorted, the at least the first subset and at least the second subset can form the ranked set of posts that are associated (at least in part) with the verified entity. Access to at least some posts in the ranked set can be provided to the verified entity. For example, the at least some posts in the ranked set can be presented or displayed to the verified entity via a feed, such as a content feed presented in an interface of an application for a social networking system.

In some implementations, ranking posts that may potentially be provided or presented to users, such as verified entities, can be based on various interests of the users. In some embodiments, machine learning models can be trained (and retrained) for ranking posts or content items for potential presentation in one or more feeds of users of the social networking system. For example, multiple users can be divided into different sets of one or more users based on various attributes of the users (e.g., age, ethnicity, income, language, etc.), and one or more models can be generated for each set of one or more users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them.

Features used to train the models can include, for instance, interactions of users with content items of a feed. Such interactions can include, for example, selecting a link in the content item, commenting on the content item, liking the content item, sharing the content item, performing a mouse hover operation on the content item, and/or hiding the content item. The models for each set of users can be used to determine levels of interest of a user in topics reflected by content items. The level of interest of a user in each topic can be indicated by a topic score. The social networking system can rank a content item for potential presentation to a user based on a topic(s) reflected by the content item and the topic score(s) of the user for the topic(s). In some cases, content items having a ranking that satisfies a selected threshold value or that satisfies specified criteria can be presented to the user in his or her feed.

In some implementations, the content processing module 222 can utilize the content filtering module 226 to perform filtering. In some instances, at least the first subset of the first set of posts and at least the second subset of the second set of posts can be filtered, by the content filtering module 226, to exclude one or more undesired posts. In one example, the one or more undesired posts can include one or more posts authored by the verified entity. In another example, the one or more undesired posts can include posts that are of lower quality or that have lesser substantive value, such as memes. Again, it is contemplated that the examples herein are provided for illustrative purposes and that there can be many variations or other possibilities.

Figure 2C:
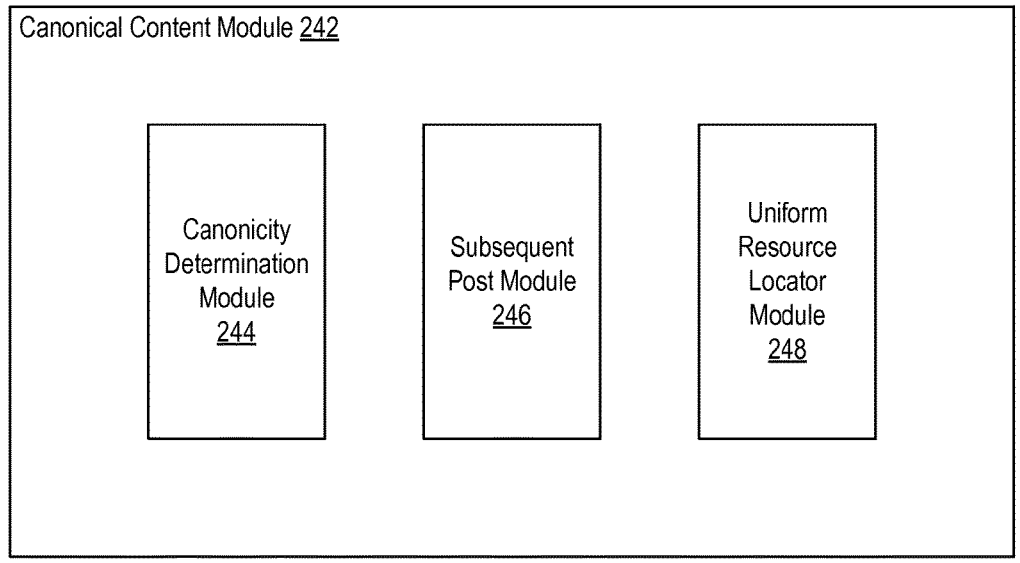
FIG. 2C illustrates an example canonical content module configured to facilitate providing content to verified entities, according to an embodiment of the present disclosure.

FIG. 2C illustrates an example canonical content module 242 configured to facilitate providing content to verified entities, according to an embodiment of the present disclosure. In some embodiments, the canonical content module 110 of FIG. 1 can be implemented as the example canonical content module 242. As shown in FIG. 2C, the example canonical content module 242 can include a canonicity determination module 244, a subsequent post module 246, and a uniform resource locator module 248.

As discussed, the canonical content module 242 can be configured to facilitate identifying a canonical post authored by the verified entity. The canonical post authored by the verified entity can, for instance, correspond to a content item written, created, produced, provided, and/or otherwise made available by the verified entity. In one example, the canonical post can correspond to an article that is officially, originally, and/or genuinely written by the verified entity. In this example, the article can be made available online and can be associated with an original link or uniform resource locator (URL).

The canonical content module 242 can utilize the canonicity determination module 244 to facilitate identifying the canonical post authored by the verified entity. In some embodiments, the canonicity determination module 244 can store a respective index for each verified entity in the social networking system. Each post or content item provided by a particular verified entity can be recorded, tracked, or otherwise stored in a particular index for the particular verified entity. Information associated with each post or content item provided by the particular verified entity can also be acquired and stored in the respective index for the particular verified entity. The information associated with each post can indicate, for example, how to locate or access the post, when the post was made available, how many times the post has been viewed or accessed, who has shared the post, and/or many other details, etc. In one example, the canonicity determination module 244 can analyze such information to determine that a particular post authored by a particular verified entity has at least a specified threshold likelihood of being canonical and can thus recognize the particular post as being a canonical post authored by the particular verified entity.

Accordingly, based on the indices and information stored therein, the canonicity determination module 244 can determine whether certain verified entities are the first, original, genuine, and/or authentic authors for certain posts. If so, those posts can be recognized as being canonical posts authored by their respective verified entities. The canonicity determination module 244 can then store mappings between the canonical posts and their respective verified entities in indices (e.g., in a respective index for each verified entity).

As discussed, the canonicity determination module 244 can identify the canonical post authored by the verified entity. In some implementations, the canonical content module 242 can utilize the subsequent post module 246 to facilitate determining that one or more subsequent posts have at least a specified threshold level of relevance with respect to the canonical post. For instance, the subsequent post module 246 can identify one or more posts subsequently made in association with the canonical post. Examples of the one or more subsequent posts can include, but are not limited to, comments, shares (and re-shares/reposts), and/or other social interactions published in relation to the canonical post. The subsequent post module 246 can also be configured to facilitate providing the verified entity with access to the one or more subsequent posts, such as by notifying the verified entity about the presence of the one or more subsequent posts and/or by linking to the subsequent posts.

In some embodiments, the canonicity determination module 244 can identify the canonical post authored by the verified entity based on detecting that a content item is posted by the verified entity. The canonicity determination module 244 can determine that the content item has less than a specified threshold likelihood of being previously posted by one or more users other than the verified entity. The canonicity determination module 244 can then identify the canonical post based on the content item. For instance, the canonical post can be identified or recognized, by the canonicity determination module 244, as corresponding to the content item. Again, it should be appreciated that the examples provided herein are for illustrative purposes and that there can be many variations or other possibilities.

In some embodiments, the canonicity determination module 244 can detect that an instance (or copy) of the canonical post has been posted by a user other than the verified entity. The instance of the canonical post can correspond to a non-canonical version of the canonical post resulting from a share or a re-share/repost of the canonical post. The subsequent post module 246 can determine that the one or more subsequent posts, such as comments, are associated with the instance of the canonical post. The one or more subsequent posts can be determined by the subsequent post module 246 to have at least the specified threshold level of relevance with respect to the canonical post based on the one or more subsequent posts being associated with the instance of the canonical post.

In one example, the subsequent post module 246 can determine that the one or more subsequent posts are associated with the instance of the canonical post based on determining that the one or more subsequent posts include at least one comment post directed at the instance of the canonical post. In this example, the subsequent post module 246 can detect that the at least one comment has been posted with respect to the instance of the canonical post. In another example, the subsequent post module 246 can determine that the one or more subsequent posts are associated with the instance of the canonical post based on determining that at least one of the one or more subsequent posts corresponds to the instance of the canonical post. In this example, the instance of the canonical post is generated based on a repost (e.g., share, re-share, etc.) of the canonical post and the one or more subsequent posts include the repost of the canonical post. Continuing with this example, the subsequent post module 246 can determine or recognize that the repost of the canonical post corresponds to one of the subsequent posts.

Additionally, the subsequent post module 246 can be configured to provide the verified entity with access to the one or more subsequent posts. In some cases, the one or more subsequent posts can be authored by one or more users other than the verified entity. In some instances, access to the canonical post (e.g., as opposed to a non-canonical version of the canonical post) can also be provided to at least some of the one or more users other than the verified entity.

Furthermore, the uniform resource locator module 248 can be configured to perform various tasks or operations associated with a uniform resource locator (URL) associated with the canonical post authored by the verified entity. In some cases, a repost of the canonical post can be associated with a copy-and-paste operation performed by a user, other than the verified entity, with respect to a uniform resource locator (URL) associated with the canonical post. The uniform resource locator module 208 can be configured to detect that the copy-and-paste operation has occurred and to recognize the repost as being a non-canonical instance (or copy) of the canonical post. In some cases, the repost of the canonical post can be associated with a cut-and-paste operation performed by the user with respect to the uniform resource locator associated with the canonical post. Similarly, the uniform resource locator module 208 can be configured to detect that the cut-and-paste operation has occurred and to recognize the repost as being a non-canonical instance (or copy) of the canonical post. As discussed, it should be understood that many variations are possible.

Figure 3:
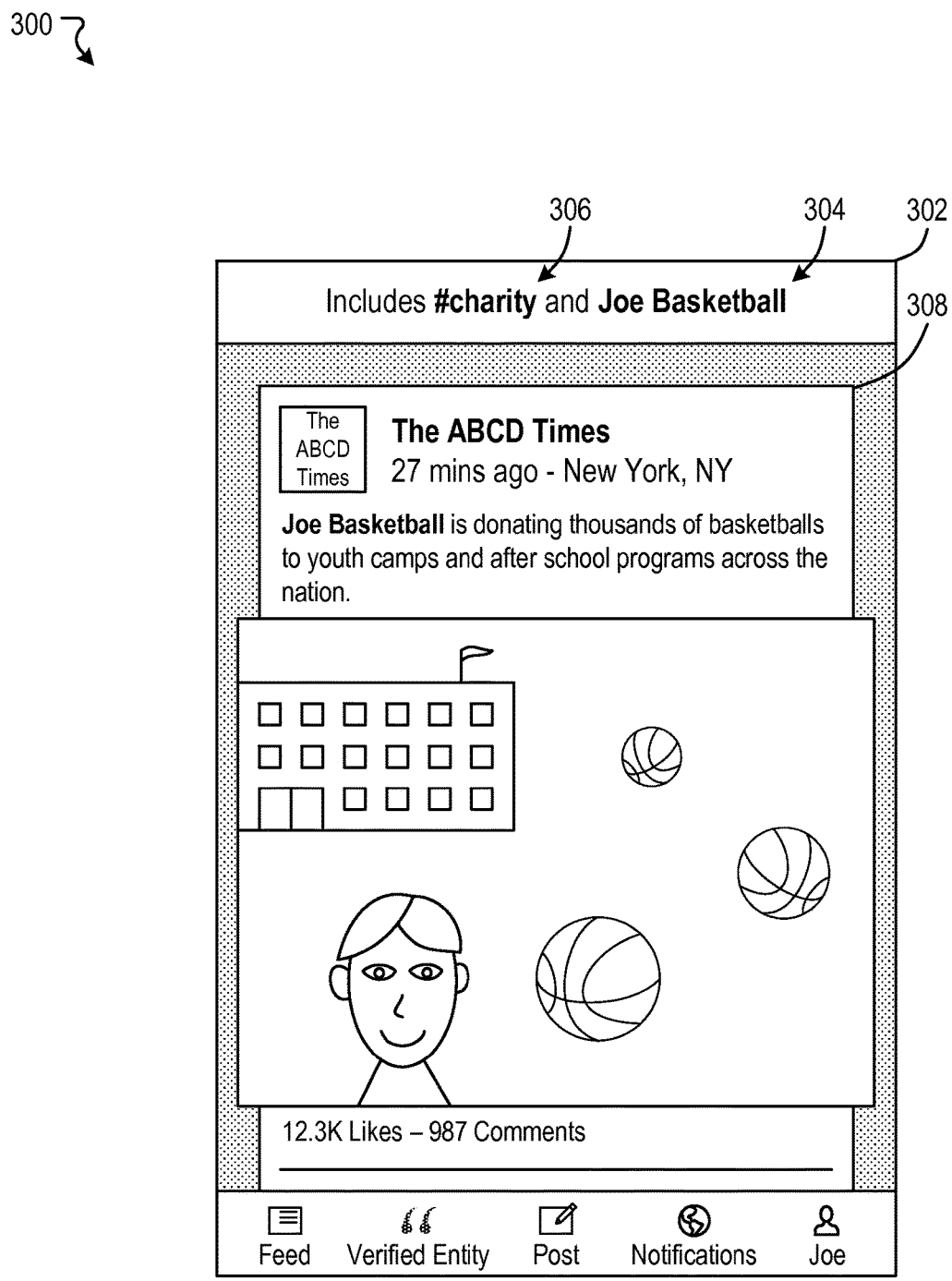
FIG. 3 illustrates an example scenario associated with providing content to verified entities, according to an embodiment of the present disclosure.

FIG. 3 illustrates an example scenario 300 associated with providing content to verified entities, according to an embodiment of the present disclosure. The example scenario 300 includes an example interface 302 for providing content to a verified entity, such as Joe Basketball 304. In the example scenario 300, Joe Basketball 304 can be a public figure (e.g., a famous athlete) whose account with a social networking system has been verified.

In this example, Joe Basketball 304 can have inputted, selected, or otherwise identified a particular topic, such as charity 306, in which Joe 304 is interested. Accordingly, the disclosed technology can analyze various posts within the social networking system to identify at least one post 308 that is associated with Joe Basketball 304 as well as with the topic of charity 306 (or with a sub-topic of donations). Access to the at least one post 308 can be provided to Joe Basketball 304 via the interface 302. It should be understood that there can be many variations or other possibilities.

Figure 4:
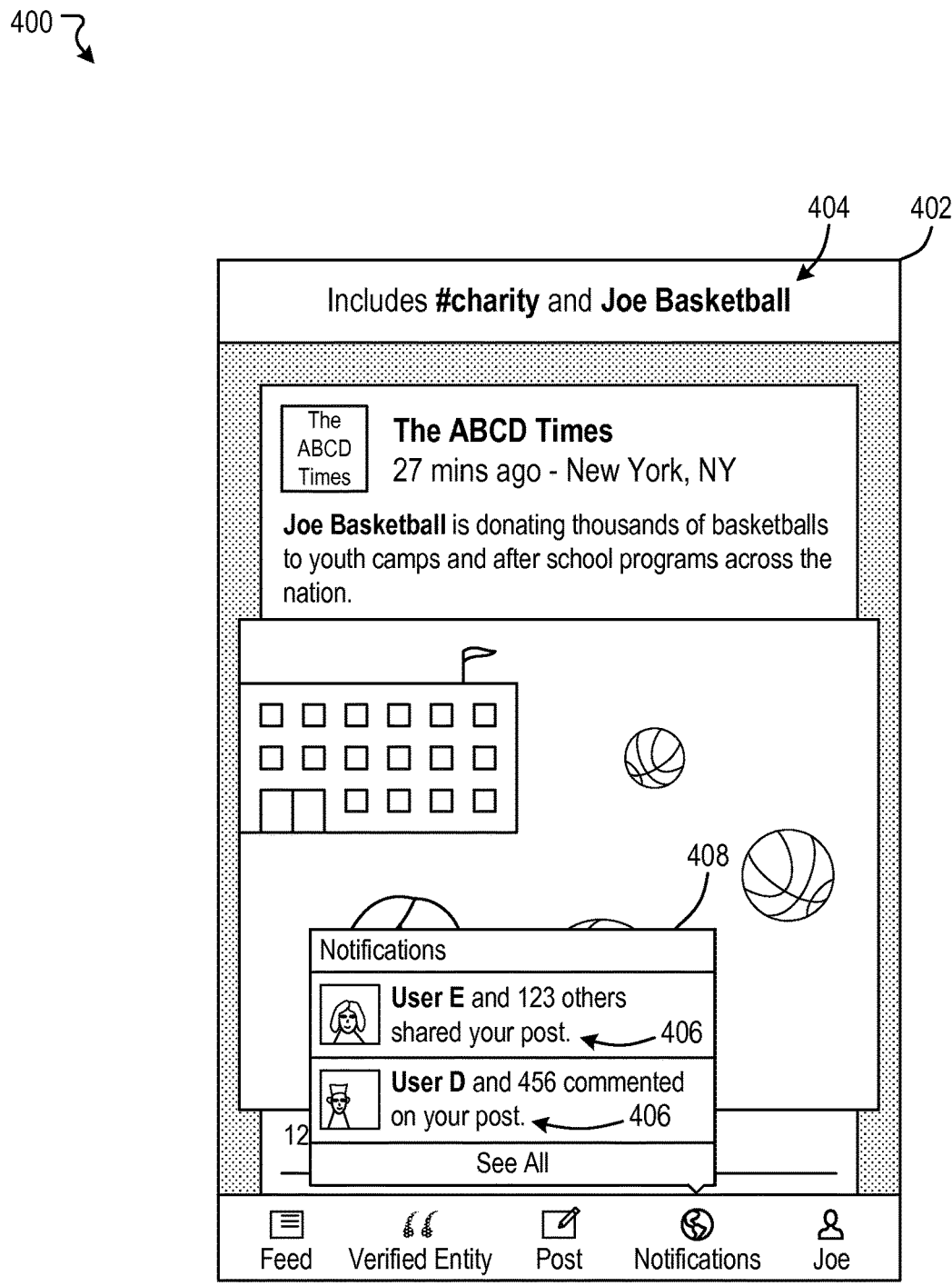
FIG. 4 illustrates an example scenario associated with providing content to verified entities, according to an embodiment of the present disclosure.

FIG. 4 illustrates an example scenario 400 associated with providing content to verified entities, according to an embodiment of the present disclosure. The example scenario 400 includes an example interface 402 for providing content to a verified entity, such as Joe Basketball 404.

In the example scenario 400, the disclosed technology can determine that Joe Basketball 404 has authored or provided a canonical post 406. The disclosed technology can further determine that subsequent posts have been made, by other users, with respect to the canonical post 406 of Joe Basketball 404. In this example, the subsequent posts can include comments as well as shares (e.g., re-shares, reposts, etc.). In some embodiments, the interface 402 can provide one or more notifications 408 indicating, to Joe Basketball 404, that there are subsequent posts in association with the canonical post 406 of Joe Basketball 404. Access to the subsequent posts can, for instance, be provided via the notifications 408. Again, many variations are possible.

Figure 5A:
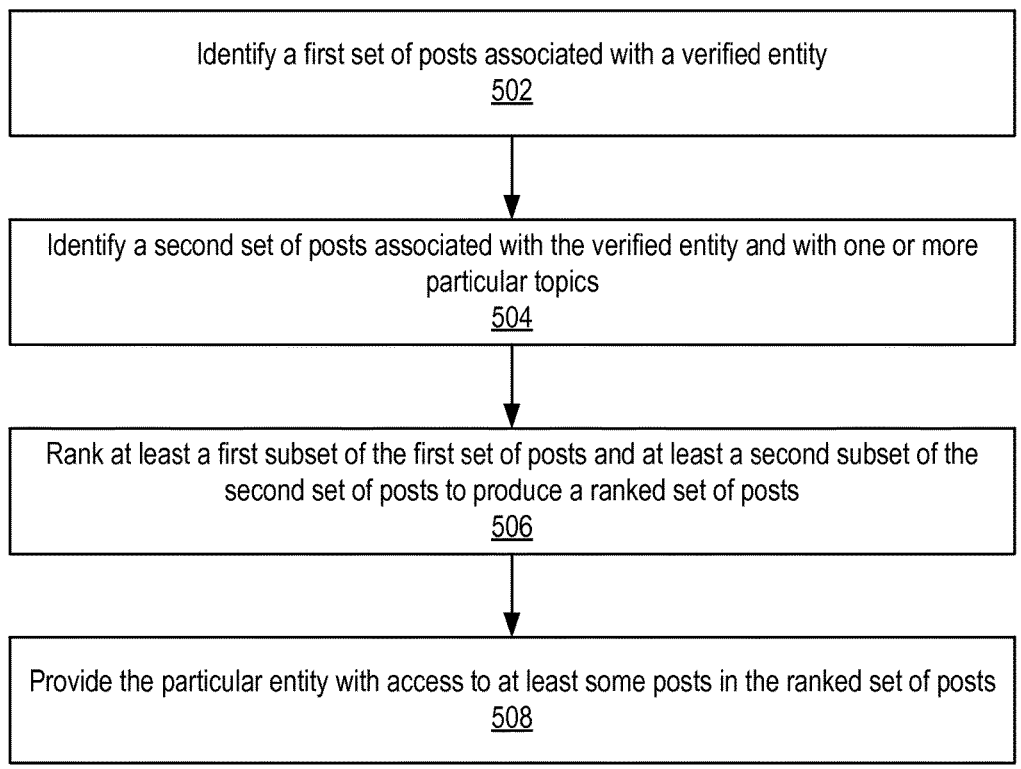
FIG. 5A illustrates an example method associated with providing content to verified entities, according to an embodiment of the present disclosure.

FIG. 5A illustrates an example method 500 associated with providing content to verified entities, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a first set of posts associated with a verified entity. At block 504, the example method 500 can identify a second set of posts associated with the verified entity and with one or more particular topics. At block 506, the example method 500 can rank at least a first subset of the first set of posts and at least a second subset of the second set of posts to produce a ranked set of posts that are associated, at least in part, with the verified entity. At block 508, the example method 500 can provide the verified entity with access to at least some posts in the ranked set of posts.

Figure 5B:
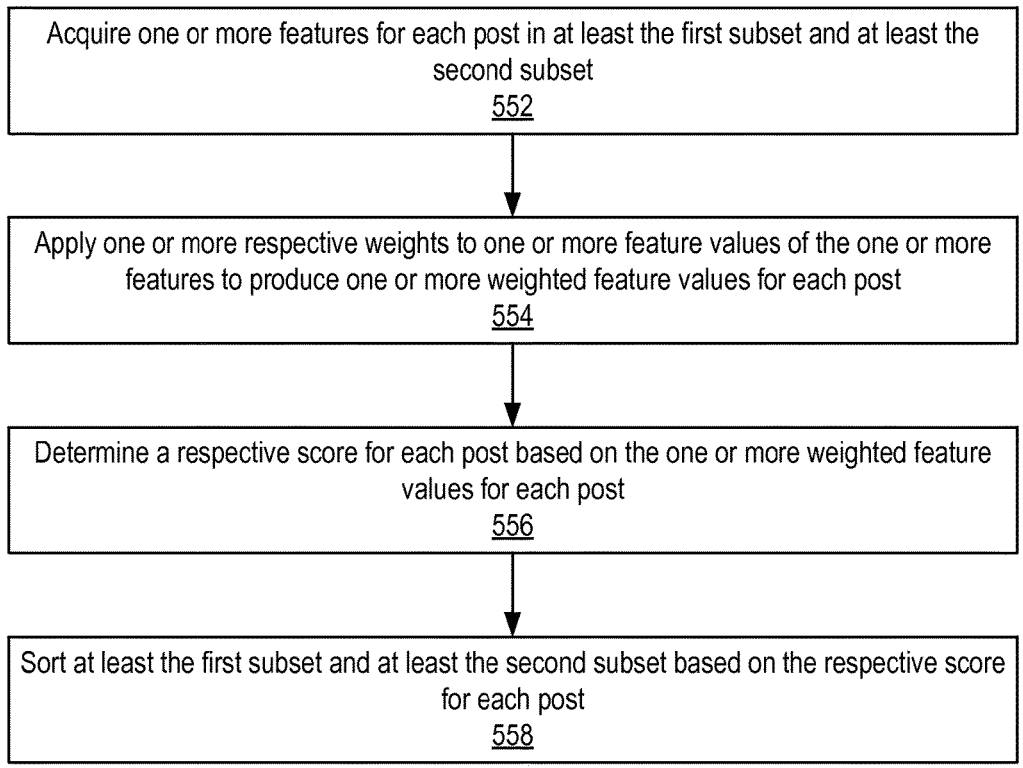
FIG. 5B illustrates an example method associated with providing content to verified entities, according to an embodiment of the present disclosure.

FIG. 5B illustrates an example method 550 associated with providing content to verified entities, according to an embodiment of the present disclosure. As discussed above, it should be appreciated that there can be additional, fewer, or alternative steps performed in similar or alternative orders, or in parallel, within the scope of the various embodiments unless otherwise stated.

At block 552, the example method 550 can acquire one or more features for each post in at least the first subset and at least the second subset. At block 554, the example method 550 can apply one or more respective weights to one or more feature values of the one or more features to produce one or more weighted feature values for each post. At block 556, the example method 550 can determine a respective score for each post based on the one or more weighted feature values for each post. At block 558, the example method 550 can sort at least the first subset and at least the second subset based on the respective score for each post.

Figure 6A:
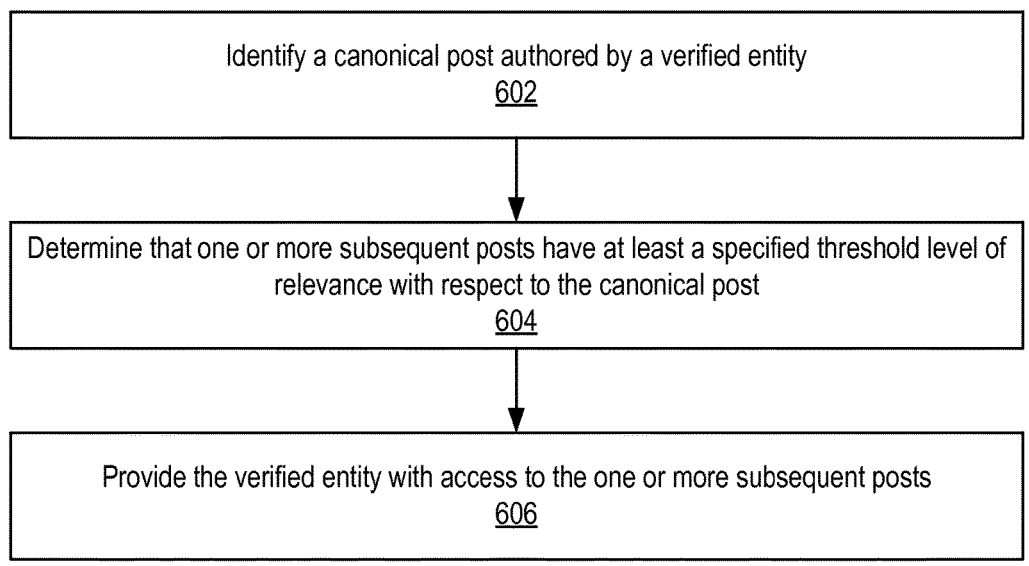
FIG. 6A illustrates an example method associated with providing content to verified entities, according to an embodiment of the present disclosure.

FIG. 6A illustrates an example method 600 associated with providing content to verified entities, according to an embodiment of the present disclosure. As discussed previously, it should be understood that there can be additional, fewer, or alternative steps performed in similar or alternative orders, or in parallel, within the scope of the various embodiments unless otherwise stated.

At block 602, the example method 600 can identify a canonical post authored by a verified entity. At block 604, the example method 600 can determine that one or more subsequent posts have at least a specified threshold level of relevance with respect to the canonical post. At block 606, the example method 600 can provide the verified entity with access to the one or more subsequent posts.

Figure 6B:
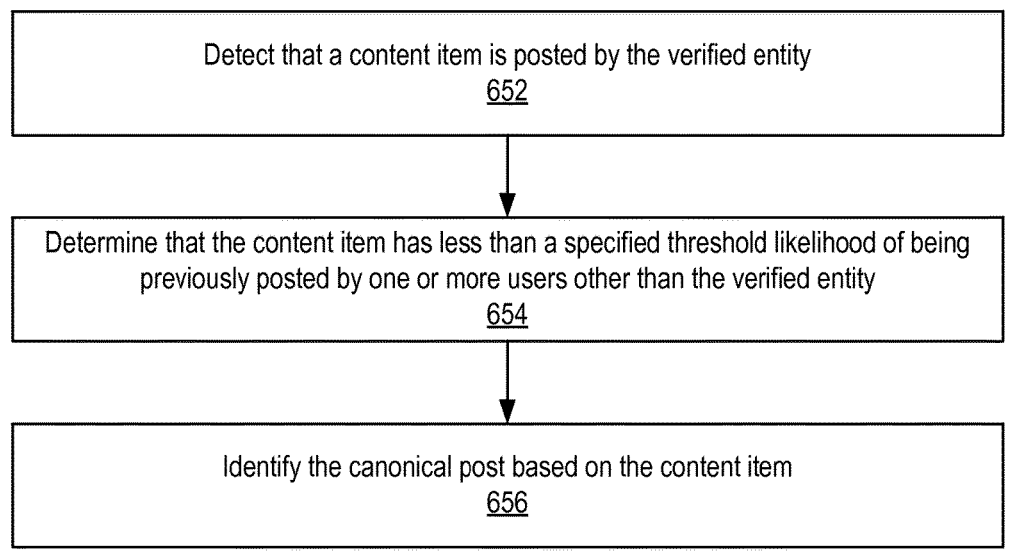
FIG. 6B illustrates an example method associated with providing content to verified entities, according to an embodiment of the present disclosure.

FIG. 6B illustrates an example method 650 associated with providing content to verified entities, according to an embodiment of the present disclosure. Again, it should be understood that there can be additional, fewer, or alternative steps performed in similar or alternative orders, or in parallel, within the scope of the various embodiments unless otherwise stated.

At block 652, the example method 650 can detect that a content item is posted by the verified entity. At block 654, the example method 650 can determine that the content item has less than a specified threshold likelihood of being previously posted by one or more users other than the verified entity. At block 656, the example method 650 can identify the canonical post based on the content item.

It is contemplated that there can be many other uses, applications, and/or variations associated with the various embodiments of the present disclosure. For example, in some instances, the disclosed technology can be applicable to or utilized with a wide variety of users, including non-verified users. In some cases, users can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
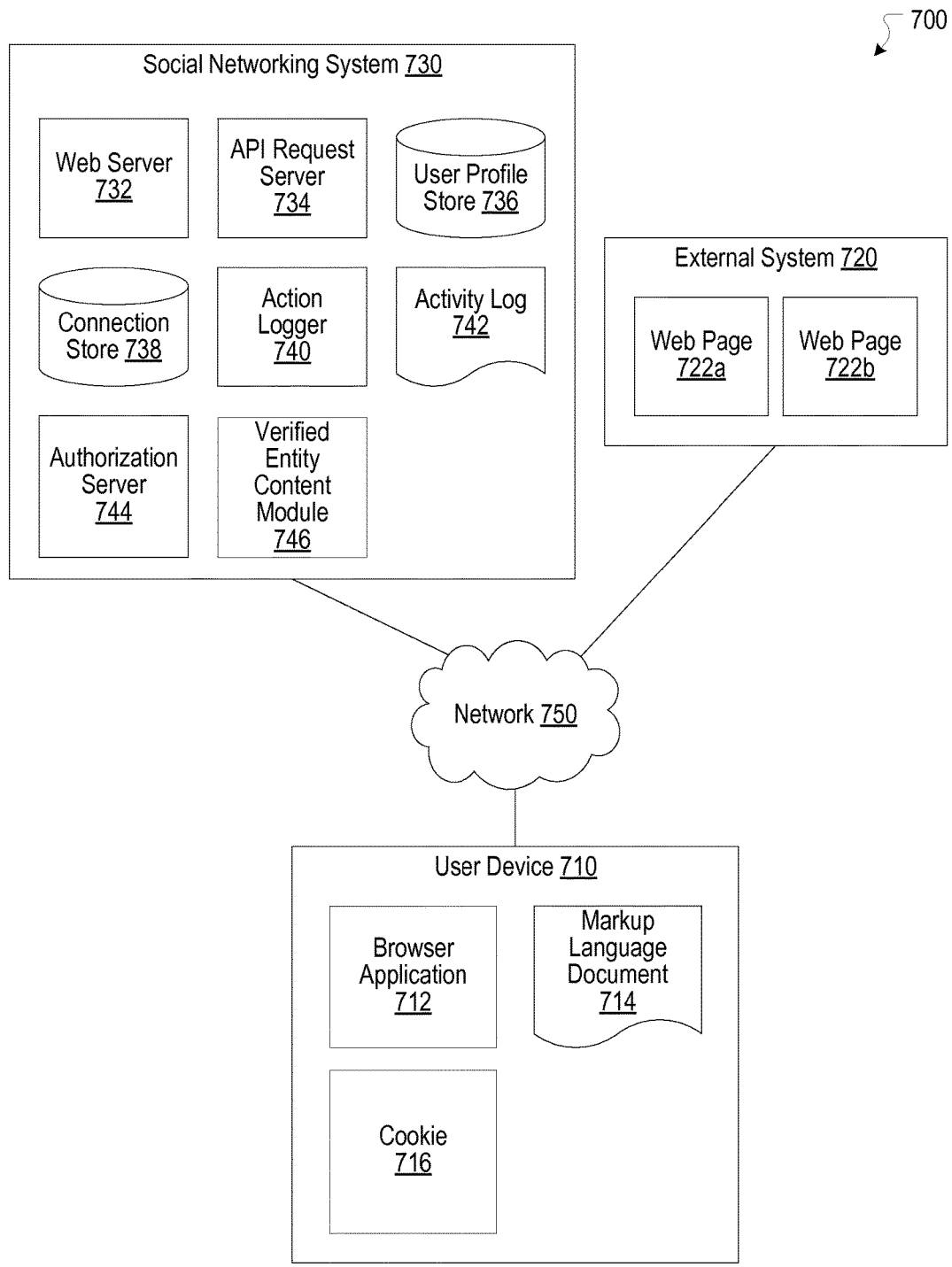
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a verified entity content module 746. The verified entity content module 746 can, for example, be implemented as the verified entity content module 102 of FIG. 1. As discussed previously, it should be appreciated that there can be many variations or other possibilities. For example, in some instances, the verified entity content module 746 (or at least a portion thereof) can be included in the user device 710. Other features of the verified entity content module 746 are discussed herein in connection with the verified entity content module 102.

Hardware Implementation

Figure 8:
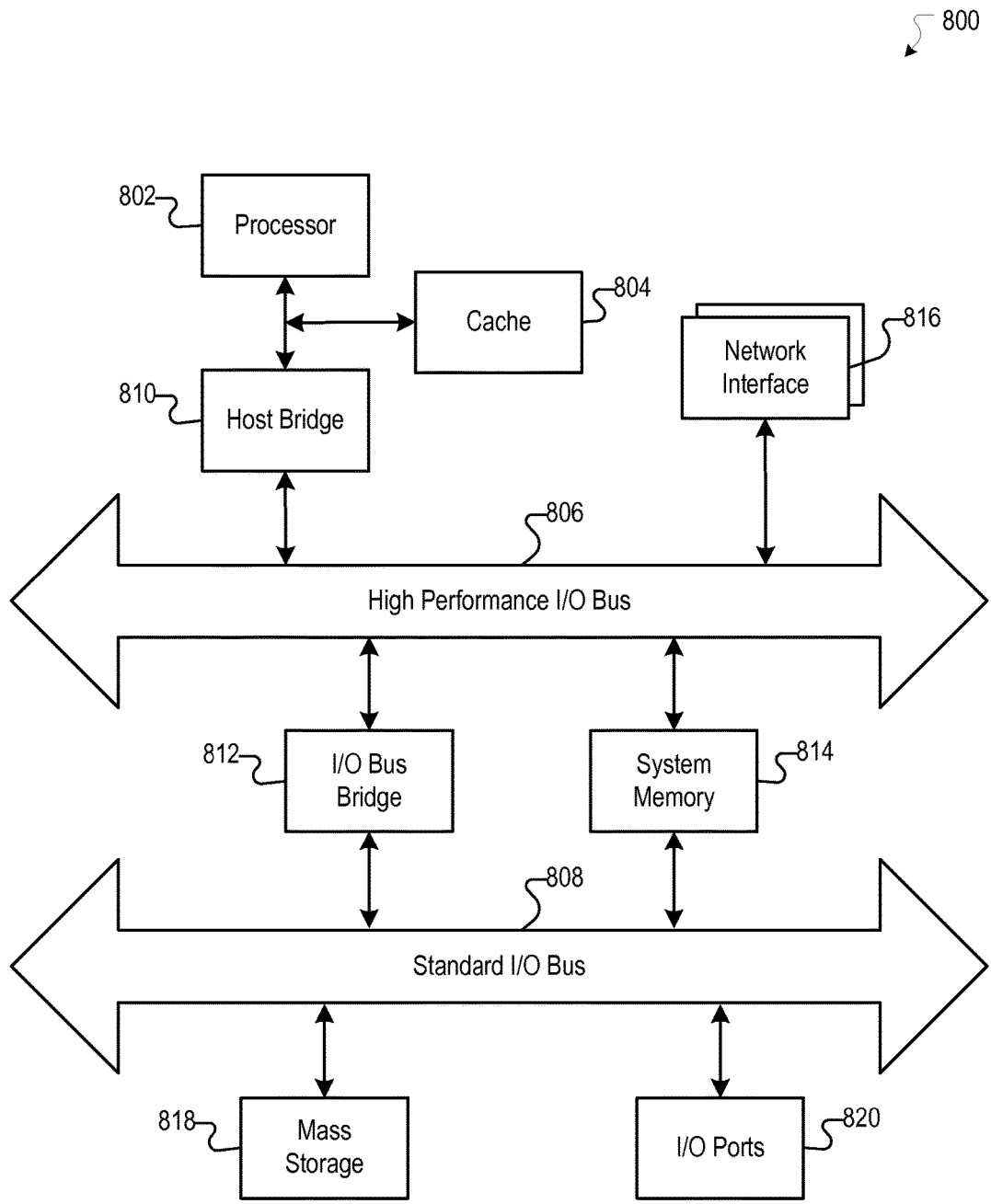
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
identifying, by a computing system, a canonical post authored by a verified entity and posted on a social networking system, wherein the identifying comprises:
detecting that a content item is posted by the verified entity on the social networking system,
determining that the content item has less than a specified threshold likelihood of being previously posted on the social networking system by one or more users other than the verified entity, and
identifying the canonical post based on the content item;
detecting, by the computing system, that an instance of the canonical post has been posted by a user other than the verified entity;
determining, by the computing system, that one or more subsequent posts on the social networking system are associated with the instance of the canonical post, wherein the one or more subsequent posts include at least one comment directed at the instance of the canonical post or include at least one post that corresponds to the instance of the canonical post;
determining, by the computing system, that the one or more subsequent posts have at least a specified threshold level of relevance with respect to the canonical post based on the one or more subsequent posts being associated with the instance of the canonical post; and
providing, by the computing system, the verified entity with access to the one or more subsequent posts on the social networking system.

2. The computer-implemented method of claim 1, wherein the determining that the one or more subsequent posts are associated with the instance of the canonical post further comprises:

determining that the one or more subsequent posts include at least one comment post directed at the instance of the canonical post.

3. The computer-implemented method of claim 1, wherein the determining that the one or more subsequent posts are associated with the instance of the canonical post further comprises:
determining that at least one of the one or more subsequent posts corresponds to the instance of the canonical post.

4. The computer-implemented method of claim 3, wherein the instance of the canonical post is generated based on a repost of the canonical post, and wherein the one or more subsequent posts include the repost of the canonical post.

5. The computer-implemented method of claim 4, wherein the repost of the canonical post is associated with at least one of a copy-and-paste operation performed by the user with respect to a uniform resource locator (URL) associated with the canonical post or a cut-and-paste operation performed by the user with respect to the uniform resource locator (URL) associated with the canonical post.

6. The computer-implemented method of claim 1, wherein the one or more subsequent posts are authored by one or more users other than the verified entity.

7. The computer-implemented method of claim 6, wherein access to the canonical post is provided to at least some of the one or more users other than the verified entity.

8. The computer-implemented method of claim 1, wherein a mapping between the canonical post and the verified entity is stored in an index.

9. A system comprising:
at least one processor; and
a memory storing instructions that, when executed by the at least one processor, cause the system to perform:
identifying a canonical post authored by a verified entity and posted on the social networking system, wherein the identifying comprises:
detecting that a content item is posted by the verified entity on the social networking system,
determining that the content item has less than a specified threshold likelihood of being previously posted on the social networking system by one or more users other than the verified entity, and
identifying the canonical post based on the content item;
detecting that an instance of the canonical post has been posted by a user other than the verified entity;
determining that one or more subsequent posts on the social networking system are associated with the instance of the canonical post, wherein the one or more subsequent posts include at least one comment directed at the instance of the canonical post or include at least one post that corresponds to the instance of the canonical post;
determining that the one or more subsequent posts have at least a specified threshold level of relevance with respect to the canonical post based on the one or more subsequent posts being associated with the instance of the canonical post; and
providing the verified entity with access to the one or more subsequent posts on the social networking system.

10. The system of claim 9, wherein the determining that the one or more subsequent posts are associated with the instance of the canonical post further comprises:
determining that the one or more subsequent posts include at least one comment post directed at the instance of the canonical post.

11. The system of claim 9, wherein the determining that the one or more subsequent posts are associated with the instance of the canonical post further comprises:
determining that at least one of the one or more subsequent posts corresponds to the instance of the canonical post.

12. A non-transitory computer-readable storage medium including instructions that, when executed by at least one processor of a computing system, cause the computing system to perform a method comprising:
identifying a canonical post authored by a verified entity and posted on the social networking system, wherein the identifying comprises:
detecting that a content item is posted by the verified entity on the social networking system,
determining that the content item has less than a specified threshold likelihood of being previously posted on the social networking system by one or more users other than the verified entity, and
identifying the canonical post based on the content item;
detecting that an instance of the canonical post has been posted by a user other than the verified entity;
determining that one or more subsequent posts on the social networking system are associated with the instance of the canonical post, wherein the one or more subsequent posts include at least one comment directed at the instance of the canonical post or include at least one post that corresponds to the instance of the canonical post;
determining that the one or more subsequent posts have at least a specified threshold level of relevance with respect to the canonical post based on the one or more subsequent posts being associated with the instance of the canonical post; and
providing the verified entity with access to the one or more subsequent posts on the social networking system.

13. The non-transitory computer-readable storage medium of claim 12, wherein the determining that the one or more subsequent posts are associated with the instance of the canonical post further comprises:
determining that the one or more subsequent posts include at least one comment post directed at the instance of the canonical post.

14. The non-transitory computer-readable storage medium of claim 12, wherein the determining that the one or more subsequent posts are associated with the instance of the canonical post further comprises:
determining that at least one of the one or more subsequent posts corresponds to the instance of the canonical post.

* * * * *